Nov. 27, 1962 R. H. DUNGAN ETAL 3,065,533
METHOD OF MAKING CERAMIC-METAL SEALS
Filed Aug. 11, 1960

INVENTORS
ROBERT H. DUNGAN
ROBERT G. JOHNSON
BY
ATTORNEY

United States Patent Office 3,065,533
Patented Nov. 27, 1962

3,065,533
METHOD OF MAKING CERAMIC-METAL SEALS
Robert H. Dungan and Robert G. Johnson, Hopkins, Minn., assignors to Minneapolis-Honeywell Regulator Company, Minneapolis, Minn., a corporation of Delaware
Filed Aug. 11, 1960, Ser. No. 49,010
4 Claims. (Cl. 29—472.7)

The present invention relates to a method of forming hermetic ceramic to metal seals.

More particularly, the present invention relates to a method for forming ceramic to metal seals using a shim of titanium metal or the like to accomplish wetting of the ceramic member by the joining metal.

In the past, various techniques have been utilized to accomplish a wetting of the surface of a ceramic member by a metal to provide a hermetic seal between the ceramic member and the metal coating. For example, it is a well established technique to paint the surface of a ceramic member with a hydride of a metal from the group titanium or zirconium. This hydride is then subsequently decomposed by application of heat to leave a thin deposit of the metal. It has long been recognized that titanium and zirconium have the capability of providing a bond to a ceramic material when used in conjunction with a base metal solder such as silver or BT solder (72Ag-28 Cu). A very thin layer of titanium or zirconium, perhaps only a monolayer, is necessary to provide wetting of the ceramic. While this method provides effective wetting of the ceramic by the base metal, the process is not a satisfactory one from a production point of view. The process requires at least two steps; the application of the titanium hydride, and its decomposition to produce titanium and the subsequent wetting of the titanium coated surface of the ceramic by the metal solder.

As an improvement over the hydride technique, incorporation of titanium into the solder member proper in the form of a core has been suggested. In this technique, the cored solder is placed adjacent the surfaces to be joined and fused at a temperature sufficiently high to dissolve the core of titanium into the solder metal so as to produce, by diffusion, a sufficient quantity of titanium at the surface of the solder to accomplish wetting of the ceramic by the solder metal. This technique has its disadvantages also. When two members of ceramic or ceramic and a metal member are to be joined, it has been found that the space or gap between the members into which the solder is to flow is critical as to its dimensions. It must be under .001 inch. If the temperature isn't well above the melting point of the solder the wetting does not occur and a non-hermetic seal is formed. In practice, it has been found that temperatures of 1600 to 1650° F. are needed when using a titanium cored BT solder. If the recess is deep, the solder does not penetrate deeply enough to provide a satisfactory seal. The high temperature necessary to obtain adequate flow has a further disadvantage in that an excess of titanium is dissolved which tends to make the joint porous and brittle.

The present invention overcomes the difficulties and shortcomings of previous techniques through the use of a shim member of titanium or the like to provide the necessary wetting of the ceramic and also to provide a readily wettable material for drawing the solder into deep recesses. The method is described in the following specification, claims, and drawing wherein:

The method of the invention is simple to use and relies for its operation on the fact that silver, BT solder, or the like readily wet titanium when they are in a molten condition. In the proper temperature range, these metals slightly dissolve the titanium, this solution in turn results in the solder metal wetting the ceramic so that the alloy is quickly and completely drawn into the joint by capillary action. The brazing or soldering action is performed in a vacuum or in a sufficiently dry and oxygen free noble gas atmosphere at the minimum temperature possible to prevent excessive embrittlement of the solder by solution of excess titanium. Experimentally it has been determined that by using a shim of titanium in conjunction with BT solder, joints having a gap of .002 inch or more may be made hermetically tight at a brazing temperature as low as 1500° F.

Figure 1:
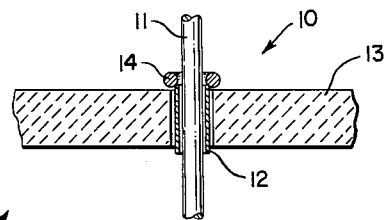
FIGURE 1 is a cross-section view of a metal pin passing through a ceramic material utilizing the method of the invention.

Referring now to the drawings, FIGURE 1 shows a metal to ceramic seal prepared in conformance with the method of the invention. 10 generally designated a pin or terminal to be sealed in a ceramic member. A metal pin member 11, for example 430 stainless steel, passes through the ceramic member 13. The ceramic member 13 may be a steatite type ceramic of high expansion with a coefficient of expansion of approximately $11 \times 10^{-6}$ in./in./° C. Inserted between the ceramic member 13 and the metal member 11 is a thin shim of titanium metal 12. The shim may be of a variety of thicknesses, but I have found that a thickness of .003 to .010 inch works particularly well. Zirconium metal works equally well although titanium is preferred. The thickness is not particularly important so long as the parts may be readily handled. The solder 14, which may be BT solder for example, is placed in contact with the titanium shim. The assembly is thus ready for brazing and is placed in a suitable vacuum furnace and fired to about 1520° F. at which point the solder flows, wetting the titanium, and bonds to both the ceramic and the metal pin member 11. The assembly is then cooled to a solid by the metal. It is desirable to limit the time during which the liquidus state exists to prevent excess solution of titanium.

It will be recognized by those skilled in the art of ceramic to metal bonding that the relative coefficients of expansion of the various members must be taken into account in preparing members such as illustrated in FIGURE 1. Matched seals or compression seals may be desired dependent on geometry and other considerations. These matters are well known in the art and will not be further discussed here.

Figure 2:
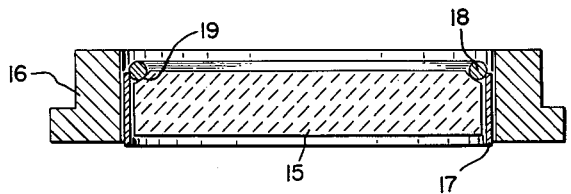
FIGURE 2 is a cross section of an annular member of metal being joined to a ceramic disk.

FIGURE 2 shows an adaptation of the method to forming a "header" wherein the ceramic member 15 is a disk with an annular member of metal 16 surrounding the ceramic member. Here a groove 19 has been made in the ceramic member 15 for placing a ring of solder metal 18. A titanium shim 17 has been placed between the ceramic member 15 and the metal member 16.

Figure 3:
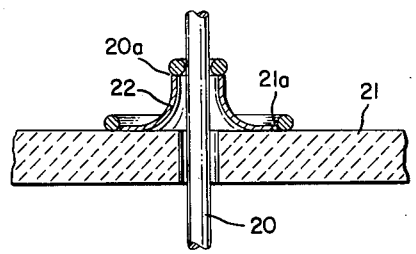
FIGURE 3 is a modification of the method of FIGURE 1 for joining a pin through a ceramic member.

FIGURE 3 is a modification of the technique shown in FIGURE 1 for making a seal between a metal member 20 and a ceramic member 21. This modification is particularly suited to the case where the expansion coefficients of the metal member 20 and the ceramic member 21 do not permit sealing. For example, if the ceramic member 21 is alumina with a coefficient of expansion of $8 \times 10^{-6}$ in./in./° C. and the metal member 20 is 430 stainless steel with a coefficient of expansion of $11 \times 10^{-6}$ in./in./° C. the seal between these members is difficult to form and when formed may fail when thermally shocked. The problem of differential expansion is solved by the use of a titanium collar 22 which is brazed or soldered to form two distinct junctions: a titanium to stainless steel at 20a and a titanium to alumina at 21a. 20a and 21a may be formed using silver metals as the brazing material. Thus, the differential expansion is solved by the flexing of the titanium member.

It is to be understood that the materials cited in regards to the modifications of the methods are not the sole materials usable. Various ceramic materials other than steatite and alumina are usable. Likewise, other solder metals and alloys other than silver and BT solder will produce similar results. Silver and BT solder are known to be well suited to ceramic to metal sealing due to their ductile nature. Similarly, the method may be utilized for the joining of ceramic to ceramic members by similar technique.

Having thus described my invention, what I desire to obtain by Letters Patent is:

1. A method of forming a hermetic ceramic to metal seal which comprises inserting a shim of a metal from the group consisting of titanium and zirconium in spaced relationship between the ceramic member and the metal member, placing a solder member in contact with an edge of said shim, said solder having such a high melting point and affinity for titanium and zirconium that alloying with the metal of the shim will result when said solder is melted, heating the assembly in the absence of oxygen and water to a temperature sufficient to melt the solder member thereby wetting the shim and causing a partial solution of the shim thereby drawing the molten solder by capillary action into the space between said shim and said members, the partial solution of said shim causing wetting of the surfaces of both said ceramic member and metal member by said solder thereby effecting a seal therebetween.

2. A method of forming a hermetic ceramic to metal seal which comprises inserting a shim of titanium metal in spaced relationship between the ceramic member and the metal member to be joined, placing a solder member of BT solder in contact with an edge of said shim, heating the assembly in the absence of oxygen and water to a temperature slightly in excess of 1520° F. to melt said BT solder thereby wetting said titanium and partially solubilizing the titanium shim into the BT solder thereby drawing the molten solder by capillary action into the space between said shim and said members, the partial solution of said shim causing wetting of said ceramic member and said metal member by said solder thereby effecting a seal therebetween.

3. The method of claim 1 wherein the solder member is silver and the temperature is slightly in excess of 1760° F.

4. The method of forming a ceramic to ceramic metal seal which comprises inserting a shim of a metal from the group consisting of titanium and zirconium in spaced relationship between the surfaces to be joined of the ceramic members, placing a solder member in contact with an edge of said shim, said solder having such a high melting point and affinity for titanium and zirconium that alloying with the metal of the shim will result when said solder is melted, heating the assembly to a temperature slightly in excess of the melting point of the solder thereby wetting said shim and drawing the molten solder into the space between said shim and said members whereby the shim is partly dissolved in said solder effecting wetting of the ceramic by the solder forming a seal therebetween.

References Cited in the file of this patent

UNITED STATES PATENTS

| | | |
|---|---|---|
| 2,668,923 | Bondley | Feb. 9, 1954 |
| 2,677,781 | Drieschman | May 4, 1954 |
| 2,680,824 | Beggs | June 8, 1954 |
| 2,686,958 | Eber et al. | Aug. 24, 1954 |
| 2,714,760 | Boam et al. | Aug. 9, 1955 |
| 2,739,375 | Coxe | Mar. 27, 1956 |
| 2,779,999 | Boam et al. | Feb. 5, 1957 |

OTHER REFERENCES

Ceramic Age, April 1954, pages 48 and 49.